ELECTRONIC CIRCUITS UTILIZING EMITTER-COUPLED TRANSISTORS

Filed July 25, 1968 2 Sheets-Sheet 1

$$Q_{t+1} = \overline{T_2} + \overline{A1} \cdot (B1 + T_1) Q_t$$

Inventor:
Herbert Stopper

BY Spencer & Kaye
ATTORNEYS.

ELECTRONIC CIRCUITS UTILIZING EMITTER-COUPLED TRANSISTORS
Filed July 25, 1968 2 Sheets-Sheet 2
Fig. 3
| A | B | $\bar{Q}$ |
|---|---|---|
| 0 | 0 | 1 |
| 0 | 1 | 0 |
| 1 | 0 | 1 |
| 1 | 1 | 1 |
Fig. 4
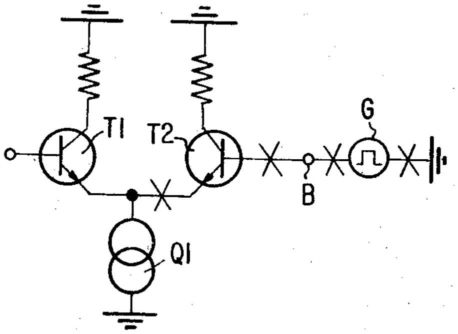
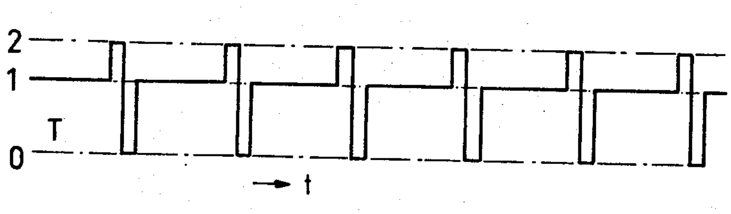
Fig. 8a
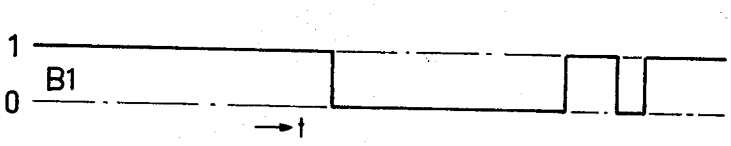
Fig. 8b
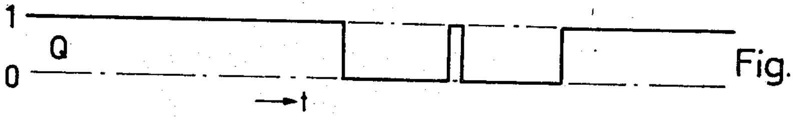
Fig. 8c
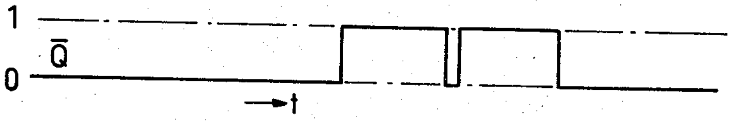
Fig. 8d
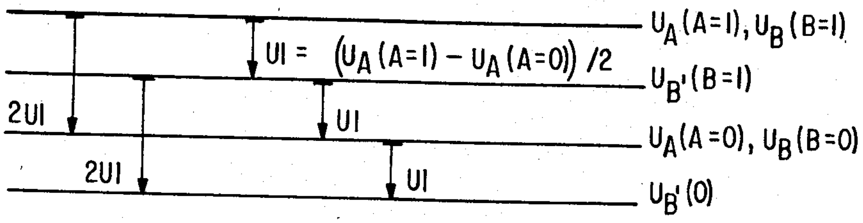
Fig. 2
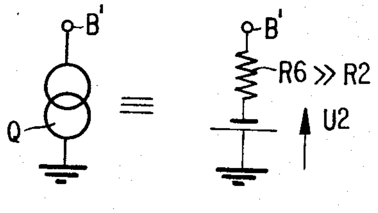
Fig. 10a
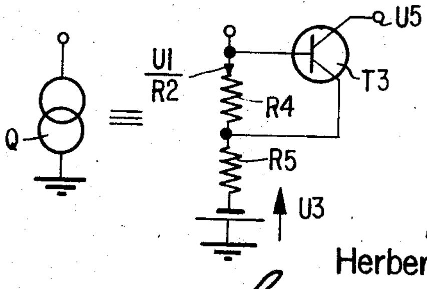
Fig. 10b
Inventor:
Herbert Stopper
BY Spencer & Kaye
ATTORNEYS.

3,515,904

ELECTRONIC CIRCUITS UTILIZING EMITTER-COUPLED TRANSISTORS

Herbert Stopper, Litzelstetten, Germany, assignor to Telefunken Patentverwertungsgesellschaft m.b.H., Ulm (Danube), Germany Continuation-in-part of application Ser. No. 650,300, June 30, 1967. This application July 25, 1968, Ser. No. 747,734
Claims priority, application Germany, July 30, 1966, T 31,738; July 29, 1967, 1,537,462
Int. Cl. H03k *3/15*
U.S. Cl. 307—290 8 Claims

ABSTRACT OF THE DISCLOSURE

An electronic circuit composed of two emitter-coupled transistors each having a separate output and two inputs, the transistor receiving the larger input signal being rendered conductive while the other transistor becomes nonconductive, the circuit being formed by connecting the output of one transistor to control one input of the other transistor, by applying a constant signal to the other input of the other transistor for establishing the mode of operation of the circuit, and by applying a control input signal to at least one input of the one transistor for controlling the output of the other transistor in a predetermined manner.

CROSS REFERENCE TO RELATED APPLICATION

This is a continuation-in-part of my copending application Ser. No. 650,300, filed on June 30, 1967.

BACKGROUND OF THE INVENTION

My copending U.S. application No. 650,300, filed on June 30, 1967, which relates to the same invention as my German Pat. No. 1,246,027, discloses a logic circuit consisting of two emitter-coupled transistors and having, despite its reduced fabrication cost, a highly varied logic function capability. This circuit is illustrated in FIG. 1. It consists of a basic logic unit 10 having two transistors T1 and T2 whose collectors are both connected to ground via identical resistors R1 and whose emitters are connected to each other and to ground via a constant current source Q1.

The constant current source Q1 furnishes a current I which is distributed between the two transistors in accordance with the values of the control voltages applied to their bases. Both transistors are controlled jointly by logic signals A and B, i.e., by the control voltages $U_A$ and $U_B$ corresponding to these signals, in such a manner that, except for the switching periods, either transistor T1 or transistor T2 becomes conductive while the other transistor remains blocked.

While the voltage $U_A$ of the logic signal A is applied directly to the base of transistor T1, the voltage $U_B$ of the logic signal B is reduced by an amount U1 so that a control voltage $U_{B'}=U_B-U1$ is applied to the base of transistor T2. U1 corresponds to half the voltage difference between the voltages corresponding to $B=1$ and $B=0$. The reduction of the control voltage $U_B$ by the value U1 is effected by the series-connection of a resistor R2 and between the terminals B and B′ and the connection of a constant current source Q2 between terminal B′ and ground to furnish a current $U1/R2$. Resistor R2 and source Q2 could be replaced by a D.C. voltage source providing a voltage U1 and connected between terminals B′ and B with the negative voltage source terminal being connected to terminal B′.

FIG. 2 shows the relative position of the signal levels. The top line $U_A(A=1)$, $U_B(B=1)$ gives the relative level of the signals for $A=1$ and $B=1$, the line $U_A(A=0)$, $U_B(B=0)$ gives that for $A=0$ and $B=0$. The control voltage $U_{B'}$ of the transistor T2, which is reduced by U1 in comparison with $U_{B'}$ lies for $B=1$ between the voltages $U_A(A=1)$ and $U_A(A=0)$, preferably in the middle between the two (line $U_{B'}(B=1)$). $U_{B'}(B=0)$ is correspondingly reduced by the same amount U1 in comparison with $U_B(B=0)$. Because of the construction of the logic circuit in FIG. 1 like a difference amplifier, that transistor to which the more positive control voltage is applied (in the case of npn substrate transistors) is in the lower resistance state in each case. Logic circuit outputs Q and $\overline{Q}$ are connected to the collectors of transistors T2 and T1, respectively. When the associated transistor is blocked, the output voltage will be substantially equal to zero, corresponding to a logic 1, while the output voltage of a conductive transistor will be approximately equal to —IR1, corresponding to a logic 0.

Thus the logic unit 10 produces the logic functions $Q=\overline{A}\cdot B$, $\overline{Q}=A+\overline{B}$. The truth table for this unit is shown in FIG. 3.

As a general rule, the level of the output signals Q and $\overline{Q}$ can be considered separately from the level of input signals A and B. The polarity of the voltage U1 in series with the base of transistor T1 is important insofar as concerns the proper selection of the circuit element values but is immaterial as regards the functioning of the circuit, provided that transistor saturation is avoided. However, when it is necessary to utilize signals Q and $\overline{Q}$ as the inputs for similar circuits without incurring the substantial expense involved in the provision of voltage level modifying elements, the polarity of voltage U1 must be as shown in FIG. 1 when npn substrate transistors are used.

It is also immaterial, as regards the function of the circuit, at which point in the control circuit of the transistor T2 the volvtage U1 is introduced. FIG. 4 shows this. In it, the input terminal B of the circuit shown in FIG. 1 is connected to ground through a signal-voltage generator G, and the control circuit of the transistor, starting from this ground connection, is closed through the current source Q1 and its emitter-to-base path. Points which may be selected for the insertion of the voltage source U1 are marked by crosses. Accordingly, the voltage source may be introduced into the emitter supply line of the transistor T2, or at any point between its base and the signal generator, or between the signal generator G and ground. Its introduction between the base and the signal generator, particularly here between the base and the input terminal B, is merely a preferred embodiment.

Alternatively, if the logic circuit is to serve as a signal generator for other circuits connected to its output, and since collector resistors R1 and transistors T1 and T2 must be considered as internal resistances in the circuits under consideration, the voltage source U1 should be inserted between ground and the collector resistor of the output in question, as shown in FIG. 5, where the voltage source is connected between the resistor R1 of output $\overline{Q}$ and ground. In a logic system employing such a circuit Q outputs should only be linked with A inputs and $\overline{Q}$ outputs with B inputs. This limitation is present because the two transistors T1 and T2 of each circuit have different supply voltages, and hence different collector voltages, thus permitting the utilization of maximum control voltages of different magnitudes while protecting the transistors from saturation. The voltage source U1 could alternatively be connected into the collector circuit of transistor T1 in which case the control restrictions and voltage level adaption requirements apply to this transistor.

Returning now to the circuit of FIG. 1, emitter followers are connected to the input points A and B. Two transistors T41 and T42 are connected to input point A, these transistors receiving input signals A1 and A2 which both are applied to an emitter-follower resistor R3. Two further transistors T51 and T52 have their emitters connected to input point B and have the series connection of resistor R2 and the constant current source Q2 as their common emitter resistance.

The various circuit parameters are selected so that its output signals Q and $\overline{Q}$ are capable of controlling all of the inputs of a similar circuit.

The above-described circuit of my application Ser. No. 650,300 furnishes the following logic functions:

$$\overline{Q}=A1+A2+\overline{B1}\cdot\overline{B2}$$

$$Q=\overline{A1}\cdot\overline{A2}\cdot(B1+B2)$$

where $+$=OR and $\cdot$=AND.

FIG. 6 shows the logic equivalent circuit diagram for the circuit of FIG. 1.

SUMMARY OF THE INVENTION

It is an object of the present invention to increase the number of functions which can be performed by circuits of the type described above.

Another object of the invention is to convert such a circuit into a D-flip-flop memory element.

A further object of the invention is to convert such a circuit into a Schmitt trigger.

Still another object of the invention is to cause the circuit output pulses to have steep edges.

These and other objects according to the invention are achieved by the provision of certain improvements in a logic circuit composed of two transistors whose emitters are coupled together and are connected to one terminal of a current supply source, a pair of collector load resistors each connected between the collector of a respective transistor and the other terminal of the current supply source, the transistors assuming respectively opposite switching states which depend on the relative levels of the control signals applied to their bases. The circuit further includes a direct voltage source connected in series with the control circuit of one of the transistors and poled for reducing the control voltage to its transistor by an amount less than the voltage swing of the control signal. The improvement according to the invention resides in the provision of switching means connecting the collector of the one transistor to the base of the other of the transistors for applying the output of the one transistor as one control input for the other transistor, and means electrically associated with the circuit for causing the control signal applied to the one transistor to have a higher peak voltage than the control signal applied to the other transistor in order to switch the circuit from the state in which the one transistor is blocking and the other transistor is conducting to the opposite state in which the conditions of the transistors are interchanged.

The present invention thus involves the development of an element from the above-mentioned logic circuit whose essential characteristics are to be that its output signal immediately follows the logic value of one of its input signals, while operating as a memory for other input signals.

The present invention thus relates to a logic circuit consisting of two transistors whose emitters are coupled together and are connected, via a current supply circuit, to one pole of a voltage supply source and whose collector resistors are connected to the other pole of the same voltage supply source. The transistors of this circuit assume respectively opposite switching states depending on the control signal applied.

The logic circuit of the present invention is further provided with a voltage source which is connected in series with the control circuit of the one transistor and which produces a voltage which is less than the voltage variation of the control signal and which is preferably one-half the control signal voltage variation.

For achieving the objects of the present invention, the collector of the first transistor is connected to the base of the second transistor, via switching means, in order to cause at least one input of the second transistor to have the same logic value as the first transistor output, and the control signals reaching the one transistor for switching from the state in which the one transistor is blocked and the other transistor is conductive to the opposite switching state have a higher voltage peak than the control signals for the other transistor.

BRIEF DESCRIPTION OF THE DRAWINGS

FIG. 2 is a diagram showing the various voltage levels in the circuit of FIG. 1.

FIG. 3 shows a logic truth table for the circuit of FIG. 1.

FIG. 4 is a circuit diagram illustrating certain modifications in the arrangement of elements in the circuit of FIG. 1.

FIGS. 8*a*, *b*, *c*, and *d* are pulse diagrams illustrating the operation of the circuit according to the present invention as a memory element.

FIGS. 10*a* and 10*b* are circuit illustrations of practical embodiments of elements of the circuit of FIG. 1.

DESCRIPTION OF THE PREFERRED EMBODIMENTS

FIGS. 1–6 have already been described in detail above.

Figure 6:
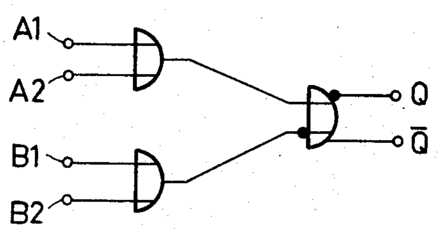
FIG. 6 is a logic representation of the circuit of FIG. 1.
Figure 7:
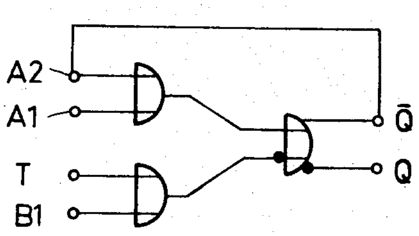
FIG. 7 illustrates the circuit according to the present invention in the form of a logic equivalent circuit diagram and its logic function.

In FIG. 7 the circuit according to FIG. 6 is modified in that its output $\overline{Q}$ is permanently connected to input A2. Furthermore, an input signal T is applied to the circuit instead of the input signal B2 of FIG. 6. Whereas the input signals A1 and B1 are binary variables having voltage values of, for example, 0 volt for a logic 1 and −0.8 volt for a logic 0, the input signal T can have values representing three logic states, i.e., 0, 1 and 2.

The voltage levels associated with the logic states 0 and 1 correspond to those for the values 0 and 1 of the input signal A1 and B1. The logic value 2, however, is characterized in that the voltage associated therewith is higher than the voltage associated with the value of logic 1, preferably by an amount equal to one-half of the base-emitter voltage of the transistor to whose base the T signal current is applied. With this arrangement, the logic function produced by the circuit of FIG. 3 is:

$$Q_{t+1}=T_2+\overline{A1}\cdot(B1+T_1)\cdot Q_t$$

where Q represents the logic state of the circuit, with $Q_t$ being the state at time *t* and $Q_{t+1}$ the state derived from the state $Q_t$ by a change in at least one of the input signals T, B1 and A1. $T_2$ and $T_1$ have the following logic values:

$T_2=1$ when $T=2$
$T_2=0$ when $T=1$
$T_1=1$ when $T=1$
$T_1=0$ when $T=2$
$T_2=T_1=0$ when $T=0$ From the above equation it results that if $\overline{A1}=0$, the output value Q of the circuit changes with $T_2$. When $\overline{A1}=0$, the circuit according to the present invention can be used, with respect to input T, as a Schmitt trigger (pulse generator) for signals symmetrical with the voltage corresponding to logic 1 (here 0 volt). The input signal T, in this mode of operation, can also be continuously variable. The switching hysteresis present will be discussed in conjunction with FIG. 9.

If $T_2=0$ and $Q_t=0$, it is not possible to bring the circuit to the state $Q_{t+1}=1$ by any combination of A1 and B1 in the arrangement of FIG. 7. The circuit can be switched from the state of $Q=0$ to the state of $Q=1$ only if $T_2=1$ $(T=2)$. If the circuit is in the state where $Q=1$, it can be held in this state, however, if $(B1+T_1)\cdot\overline{A1}=1$. The state of the circuit can thus only change when an input pulse $T_2=1$ occurs and $T_2$ can thus be considered as a trigger signal which enables the input signals A1 and B1 to influence the state of the circuit.

It must here be noted that the circuit will first assume the state of $Q=1$ whenever a trigger signal $T_2=1$ appears and it is only after $T_2=1$ has disappeared, that the circuit will consistently assume a state determined by the product $\overline{A1}\cdot(B1+T_1)$.

If, in particular, the input signal A1 is constantly held at a voltage corresponding to logic 0 (i.e., $\overline{A1}=1$) and if $T_2$ is a periodically recurring control signal, e.g., a clock pulse signal, the circuit of FIG. 7 functions as a pulse-controlled D-flip-flop i.e., the output Q follows the input signal B1 existing during time intervals corresponding to the occurrence of the clock pulse signals. The operation of the circuit of FIG. 7 as a D-flip-flop having the unvarying parameter $\overline{A1}=1$ is illustrated in FIGS. 8.

FIG. 8*a* shows the clock pulse signal T periodically alternating between the logic values 0 and 2 and assuming a logic value 1 between alternation periods. Means for providing such a signal T could be readily devised by one skilled in the art.

FIG. 8*b* shows the time variations of the input signal B1.

FIG. 8*c* shows the resulting time variations of the output signal Q which represents the existing switching state of the circuit.

FIG. 8*d* shows the corresponding inverse variations of $\overline{Q}$.

FIGS. 8*a*–8*c* clearly illustrate the D-flip-flop function. Each clock pulse signal is constituted by a $T=2$ pulse $(T_2=1)$, followed by a $T=0$ pulse $(T_1=T_2=0)$. During the intervals between clock pulse signals, $T=1$ $(T_1=1, T_2=0)$. If, during the occurrence of a $T=0$ pulse, $B1=1$, Q will have the value 1 during the subsequent pulse interval. If, at the occurrence of a $T=0$ portion of a clock pulse signal, $B1=0$, Q will have the value 0 during the subsequent pulse interval. FIGS. 8 also show that when $B1=0$ during the period of a clock pulse signal, Q directly follows the logic value of the clock pulse signal.

During the pulse intervals, $T_1=1$. Thus $(B1+T_1)$ is then also always $=1$, and the output value present at the beginning of the interval is "stored" for the duration of the interval, independent of variations in the value of B1.

Figure 1:
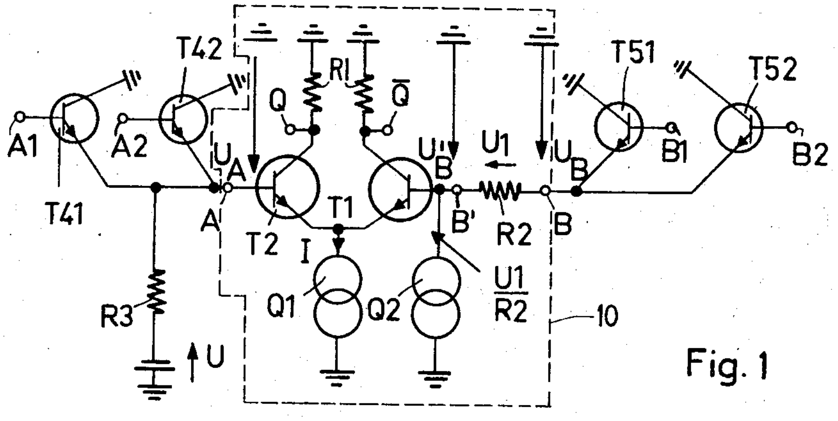
FIG. 1 is a circuit diagram of a circuit used in the construction of embodiments according to the invention.
Figures 5, 9:
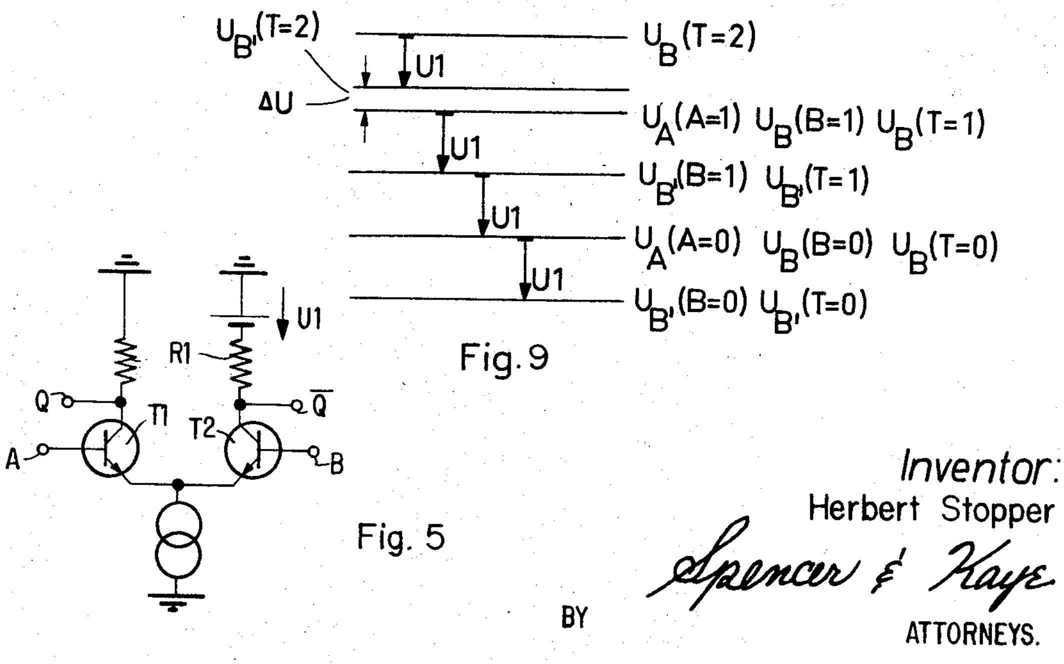
FIG. 5 is a circuit diagram illustrating another modification of the circuit of FIG. 1.
FIG. 9 shows the relative positions of the control signal voltages of the circuit according to the present invention.

FIG. 9 shows the relative signal voltage levels at points A, B and B′ of the circuit of FIG. 1. The relative levels of the signals at these points for $A=1$, $B=1$ and $T=1$ are indicated by the line $U_A(A=1)$, $U_B(B=1)$, $U_B(T=1)$ and the level for $A=0$, $B=0$ and $T=0$ is indicated by the line $U_A(A=0)$, $U_B(B=0)$, $U_B(T=0)$. The control voltage $U_{B'}$ applied to the base of transistor T1, which voltage is less than $U_B$ by an amount equal to U1, is for $B=1$, equal to the mean value of the voltages $U_A(A=1)$ and $U_A(A=0)$. Accordingly, $U_{B'}(B=0)$ is likewise less than $U_B(B=0)$ by the same amount equal to U1.

Preferably, $U1=U_{BE}/2$, $U_{BE}$ being the base-emitter voltage of the conductive transistor.

Due to the sum-and-difference amplifier-type construction of the logic circuit of FIG. 1, that transistor to which the more positive control voltage is applied (for npn-transistors) is in its low-resistance state and the output of that transistor will be at a voltage corresponding to a logic 0.

If now output $\overline{Q}$ is connected, for example, via switching means constituted by transistor T42, to input point A (FIG. 1) as is indicated in FIG. 7, and if transistor T1 is not conducting, i.e., $\overline{Q}=1$, the base of the transistor T2 will be at a more positive voltage than the base of transistor T1, with respect to the common emitter point for both transistors T1 and T2. This positive voltage $[U_A(A=1)]$ maintains this transistor T2 in a conductive state $(Q=0)$ and, correspondingly, transistor T1 in a blocked state. The feedback connection of $\overline{Q}$ to A2 thus provided in the circuit of FIG. 7 imparts to the circuit a stable characteristic for $\overline{Q}=1$.

In order to switch the circuit from this state to the opposite state in which transistor T1 becomes conductive and transistor T2 is blocked, the base of transistor T1 (point B′) must become more positive, when npn-transistors are used, than the base of transistor T2. The latter base, however, is at the voltage $U_A(A=1)$ due to the feedback connection. Thus, point B′ must become more positive than $U_A(A=1)$ by an amount, ΔU, which is sufficient to bring transistor T1 to a completely low-resistance state and transistor T2 to a completely high-resistance state. The voltage which accomplishes this is indicated in FIG. 9 as $U_B'(T=2)$. In order to realize this voltage at point B′, the voltage at point B must be more positive, by U1, than the voltage at B′ or $$U_B(T=2)=U_{B'}(T=2)+U_1=U_B(B=1)+\Delta U+U1$$

$U_B(T=2)$ thus also constitutes the positive switching voltage for operation of the circuit as a Schmitt trigger. The switching voltage in the negative range is correspondingly $U_A(B=1)-(U1+\Delta U)$.

Due to the feedback coupling according to the present invention, the characteristic of the circuit of FIG. 7 traverses a negative resistance region during switching from $Q=1$ to $Q=0$. This coupling causes the switching process to be initiated during the transition from $\overline{Q}=1$ to $\overline{Q}=0$ at $\Delta U \simeq 0$ volt, or sooner. Thus, if the circuit is operated as a Schmitt trigger, a reduced switching hysteresis results. An actual circuit according to the invention, using silicon transistors, had its positive switching point at a voltage for T of about +0.3 volt and its negative switching point ($\overline{Q}$ from 0 to 1) at an equal negative voltage.

However, when the circuit is operated as a pulse sequence circuit, e.g., as a clock-pulse-controlled D-flip-flop, $U_B(T=2)$ must be selected to be high enough that $U_B(T=2)$, will have a sufficient signal-to-noise ratio relative to the voltage $U_B(T=1)$. If the signal-to-noise ratio is selected to be $\Delta U=U1$, a voltage of +2U1 results for $T=2$. This is a preferred value for practical circuit operation.

The above-mentioned return coupling results in very steep pulse fronts for the output signals Q and $\overline{Q}$ of the circuit. In addition to the advantages offered by the present invention, i.e., permitting the use of the logic circuit disclosed in my copending application Ser. No. 650,300, as a Schmitt trigger or a clockpulse-controlled D-flip-flop by connecting one of its input terminals with one of its output terminals, there now exists the further advantage that the output pulses of the circuit according to the present invention have very steep edges.

A first practical embodiment of either of the current sources Q1 and Q2 of FIG. 1 is shown in FIG. 10*a* to consist of a series arrangement of a voltage source U2 and a resistor R6 whose resistance is substantially larger than that of R2, at least for current source Q2 so that this current source will have the characteristics described in connection with the circuit of FIG. 1.

A second embodiment of these current sources is shown in FIG. 10*b* to include a series arrangement of a voltage source U3 and two resistors R4 and R5 connected between ground and the current source connection point (B′ for source Q2).

The emitter of a transistor T3 is connected to the junction point between the resistors R4 and R5. The base of this transistor is connected to the other connection point of the resistor R4. An auxiliary voltage U5 is applied to the collector of the transistor.

The mode of operation of this circuit is based on the sharply curved emitter characteristic of the transistor according to which small variations in the base-to-emitter voltage are converted into large variations of the emitter current. A variation in the base-to-emitter voltage leads to a variation in the same sense in the emitter current which in turn causes a variation in the same sense in the voltage at the resistor R5. Thus the transistor T3 causes a flow into the voltage divider composed of the resistors R4 and R5 and this maintains the base-to-emitter voltage constant. Since the base current of the transistor is negligible in comparison with the current through the resistor R4, a constant base-to-emitter voltage at the transistor T3 also means a constant current through resistor R4.

The resistances of the resistors R4 and R5 as well as the voltage U5 depend on the current to be obtained. The dimensioning of the current sources Q1 and Q2 will therefore generally be different. The important advantages of this current source lie in its low power loss and its low capacitance. The latter is particularly important in connection with monolithically integrated circuits. In this technique, the transistors have a considerable capacitance between the collector and ground which renders the use of the collector-to-emitter path of such transistors substantially impossible as a current-regulating element at very high frequencies.

It will be understood that the above description of the present invention is susceptible to various modifications, changes and adaptations.

I claim:

1. In a logic circuit composed of two transistors whose emitters are coupled together and are connected to one terminal of a current supply source, a pair of collector load resistors each connected between the collector of a respective transistor and the other terminal of the current supply source, the transistors assuming respectively opposite switching states which depend on the relative levels of the control signals applied to their bases, the logic circuit further including a direct voltage source connected in series with the control circuit of one of the transistors and poled for reducing the control voltage to its transistor by an amount less than the voltage swing of the control signal, the improvement comprising: switching means connecting the collector of said one transistor to the base of the other of said transistors for applying the output of said one transistor as one input for said other transistor and means electrically associated with said circuit for applying to said one transistor a control signal having a higher peak voltage than the signal applied to said other transistor in order to switch said circuit from the state in which said one transistor is blocking and said other transistor is conducting to the opposite state in which the conditions of said transistors are interchanged.

2. An arrangement as defined in claim 1 further comprising function signal applying means connected to said other transistor for applying a second input signal thereto whose value determines the function performed by said circuit.

3. An arrangement as defined in claim 2 for use as a pulse generator wherein said second input signal has a value corresponding to a logic 1, whereby the output of said other transistor has a value corresponding to a logic 1 only when the control signal applied to said one transistor has a higher voltage than said second input signal.

4. An arrangement as defined in claim 2 for use as a memory D-flip-flop wherein said second input signal has a value corresponding to a logic 0, said arrangement further comprising information signal applying means connected to said one transistor for applying a binary information input signal thereto which determines the value stored at the output of said other transistor when the control signal applied to said one transistor ceases to have a higher peak voltage than that of the signal applied to said other transistor.

5. An arrangement as defined in claim 4 wherein said control signal is constituted by a train of spaced pulses having a higher peak voltage than the signal applied to said other transistor and the output of said other transistor has an unvarying value during each interval between successive pulses.

6. An arrangement as defined in claim 1 wherein the peak voltage of the control signal is greater than that of the signal applied to said other transistor by an amount equal to one-half the base-emitter voltage of said one transistor.

7. An arrangement as defined in claim 1 wherein said switching means comprise an input transistor having its base connected to said one transistor collector and its emitter connected to said other transistor base.

8. An arrangement as defined in claim 1 wherein said means for applying a control signal comprise an input transistor having its base connected to receive a controlling signal which is variable between three voltage levels and its emitter connected to the base of said one transistor.

References Cited

UNITED STATES PATENTS

| | | | |
|---|---|---|---|
| 3,140,405 | 7/1964 | Kolling | 307—203 X |
| 3,329,835 | 7/1967 | D'Agostino | 307—215 |
| 3,339,089 | 8/1967 | Bergman | 307—218 X |
| 3,417,261 | 12/1968 | Walsh | 307—218 X |

DONALD D. FORRER, Primary Examiner

U.S. Cl. X.R.

307—203, 207, 217, 218